United States Patent [19]

Snook

[11] 4,051,304

[45] Sept. 27, 1977

[54] ELECTRIC BATTERIES

[75] Inventor: James Chetwood Snook, Hale, England

[73] Assignee: Chloride Group Limited, London, England

[21] Appl. No.: 659,894

[22] Filed: Feb. 20, 1976

[30] Foreign Application Priority Data

Feb. 21, 1975 United Kingdom .................. 7489/75

[51] Int. Cl.² .............................................. H01M 4/00
[52] U.S. Cl. ........................................ 429/94; 429/149
[58] Field of Search .............. 136/6 A, 134 R, 134 P; 429/149–160, 162, 94, 178

[56] References Cited

U.S. PATENT DOCUMENTS

| 3,345,211 | 10/1967 | Lafon et al. | 136/6 A X |
| 3,395,044 | 7/1968 | Shoeld | 136/6 A X |
| 3,553,019 | 1/1971 | Bushrod et al. | 136/6 A X |
| 3,663,721 | 5/1972 | Blondel et al. | 136/6 A X |
| 3,703,589 | 11/1972 | Rigsby, Jr. | 136/134 R |
| 3,764,393 | 10/1973 | Fujimoto | 136/134 R |
| 3,920,477 | 11/1975 | Alaburda | 429/194 |
| 3,922,175 | 11/1975 | Granqvist | 136/6 A |

Primary Examiner—C. F. LeFevour
Attorney, Agent, or Firm—Oblon, Fisher, Spivak, McClelland & Maier

[57] ABSTRACT

A battery is disclosed in which each cell electrode structure comprises an assembly of a single first electrode of one polarity separated by a separator from a single second electrode of the other polarity, the assembly being arranged to provide an array of multiple layers of electrode of alternating polarity, an integral portion of the first electrode extending out to one side of the cell and integral portion of the second electrode extending out to the other side of the cell, one integral portion being connected to or integral with an electrode support structure in the adjacent cell, or a battery terminal, on its side of the cell, and the other integral portion being connected to or integral with an electrode support structure in the other adjacent cell on its side of the cell.

17 Claims, 11 Drawing Figures

ELECTRIC BATTERIES

This invention relates to electric batteries and is concerned with an arrangement of the electrodes giving improved performance characteristics.

According to the present invention a multicell electric battery has separators sandwiched between electrodes of opposite polarity, the complete sandwich being folded to form a stack of laminae in each cell.

In one form of the invention the electrodes are folded in a zig-zag form to provide a structure with two laminae of one polarity alternating with two laminae of the other polarity.

Adjacent layers of the structure may be in contact or spaced apart. In the former case the adjacent laminae of the same polarity may be connected together, as by welding or burning, along their edges parallel to and remote from the fold between them, the positive electrode of one cell forming a continuation of the negative electrode of an adjacent cell.

In another form of the invention the electrodes in each cell are in the form of a flattened spiral formed by winding or winding and flattening.

In one arrangement the electrodes are arranged with the folds vertical and each passes through a vertical slot through the intercell partition, the slot being substantially the full height of the partition.

In an alternative arrangement the electrodes are arranged with the folds horizontal and each electrode passes over the intercell partition or through a horizontal slot in its upper part.

The invention may be put into practice in various ways but certain specific embodiments will be briefly described by way of example as applied to a lead acid storage battery, with reference to the accompanying diagrammatic drawings, in which.

Figure 1:
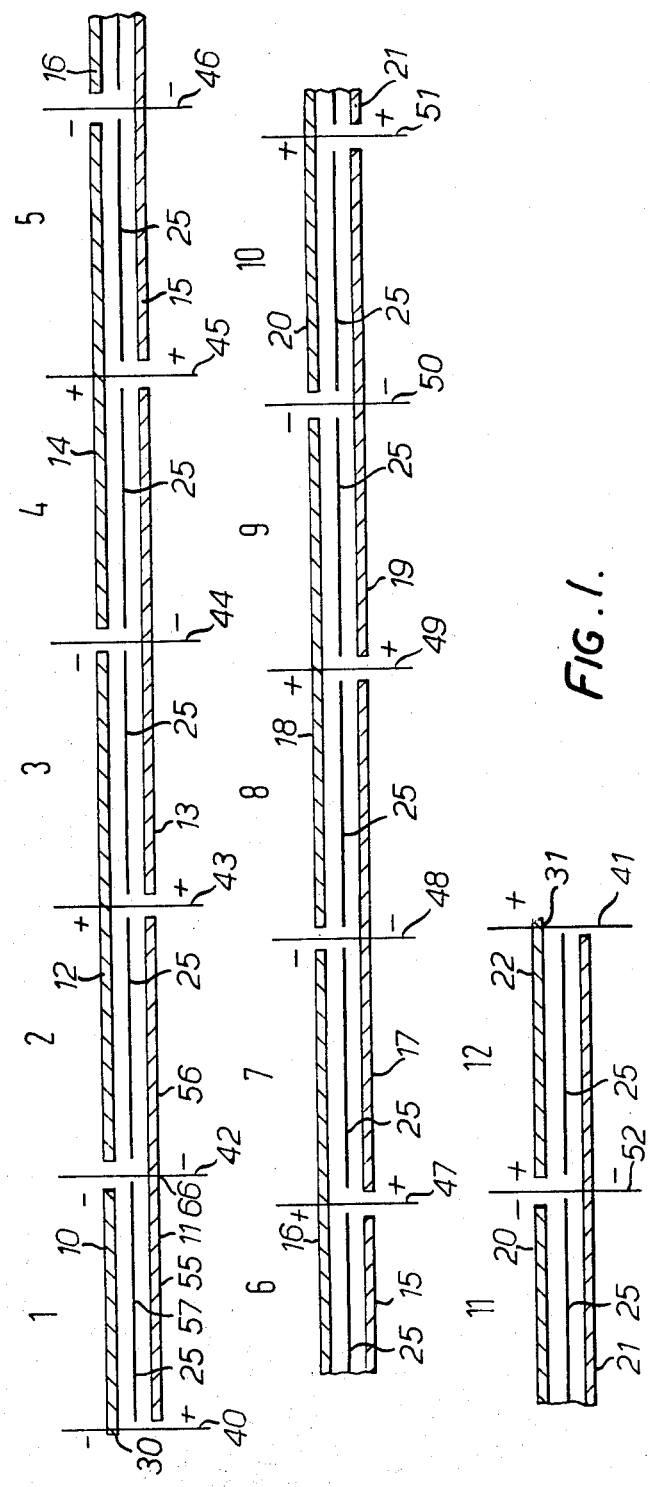
FIG. 1 is a diagrammatic side elevational view of an electrode separator assembly prior to folding or winding into a 12 cell electrode array for insertion into a 12 cell battery.

In each construction shown in the drawings a single metal strip serves as the support for the active material of the positive electrode of one cell and of the negative electrode of a neighbouring cell. This can be seen most clearly by reference to FIG. 1. Lengths of pasted strip 10 to 22 are superimposed with interleaved lengths of separator material 25, overlapping in such a way that the end of one strip is approximately at the middle of the next strip so that the positive and negative active material areas, which will be referred to as laminae, of the same cell (but of different strips) are superimposed with the separator 25 between them.

Alternatively the strips of electrode support and separators can be laid down sequentially in the manner in which a roof is tiled or shingled.

Thus, in FIG. 1 piece 10 is laid down, a separator 25 is laid over it, the half 55 of piece 11 is then laid over the separator, and another separator piece 25 laid over the portion 56 of piece 11, then the left hand half of piece 12 is laid over the separator 25 superposed on the piece 56 and the sequence repeated with piece 13.

FIG. 1 illustrates an electrode assembly for a 12 cell battery.

It is made up of six equal lengths of lower electrode material arranged in a row with the ends of each piece spaced a few cms apart e.g. 3 to 10 cms. The lengths are anything from 100 to 200 cms long; and may be of any desired width e.g. 5 to 30 cms wide, the ratio of length to width typically being in the range 5:1 to 20:1. The strips may be of thin cast grid form or wrought form but are preferably of expanded mesh. The grids are preferably 0.3 to 1.0 mms thick especially 0.5 to 0.8 mms thick. The preferred alloy is a lead calcium alloy preferably containing 0.08 to 0.09 % calcium.

Alternative alloys include 99.9% lead and antimonial alloys such as those disclosed in U.S. Pat. Nos. 3,879,217 and 3,912,537.

The strips are pasted with a universal paste composition since part of the strip has to be converted to positive active material in one cell and to negative active material in the adjacent cell.

The mid point of the strip is left unplated right across its width for a few cms e.g. 3 to 10 cms or is cleaned after pasting, since this is the region at which it will pass from one cell to the other.

One suitable universal paste composition comprises
60 lbs of Hardinge grey oxide
12 grams of fibre
82 grams of Vanisperse CB
3.47 liters of water
1.93 liters of 1.400 sp. gravity sulphuric acid.

This is readily converted electrochemically in the cell either to positive or negative active form.

Twelve pieces 25 of very thin separator material about 0.3 to 0.8 mms wider than the strip and just under half the length of the strip are positioned over the six strips of lower electrode material with a gap of a few cms e.g. 3 to 10 cms leaft at the mid point of each strip. In a modification (not shown) the separator pieces are made slightly longer and are turned under the free ends of the six lower electrode pieces. In a further modification (also not shown) the separator is slightly over double the width of the plates and is wrapped round what will be bottom of one of the plates so as to envelope it.

Starting at one end a half length 10 of upper electrode support of the same metal composition and structure and pasted with the same active material is laid over the free end of the lower electrode piece 11 with one end 30, the terminal end, let it be the negative terminal, leaft free of paste and extending out over the free end of the lower piece 11.

Five full length upper electrode pieces 12, 14, 16, 18 and 20 of the same composition and structure as the lower electrode pieces 11, 13, 15, 17, 19 and 21 are then laid in a row over the separator pieces 25 and are spaced apart end to end by the same distances as the pieces 11 and 13. A half length upper electrode piece 22 ends the upper row and has a terminal end 31, the positive terminal which extends out over the free end of the lower piece 21.

The terminals 30 and 31 are shown diagrammatically as extending out of the cell through a wall 40 or 41 respectively.

The individual cells 1 to 12 are shown as being separated by intercell partitions 42 to 52, lower piece 11 passing through partition 42, upper piece 12 through partition 43 and so on. Thus on electrolytic formation of the battery the left hand half 55 of piece 11 becomes a positive electrode and the right hand half 56 becomes a negative electrode.

This assembly can then be arranged into an array or laminae or multiple layers of electrode of alternating polarity by a variety of techniques.

Figure 2:
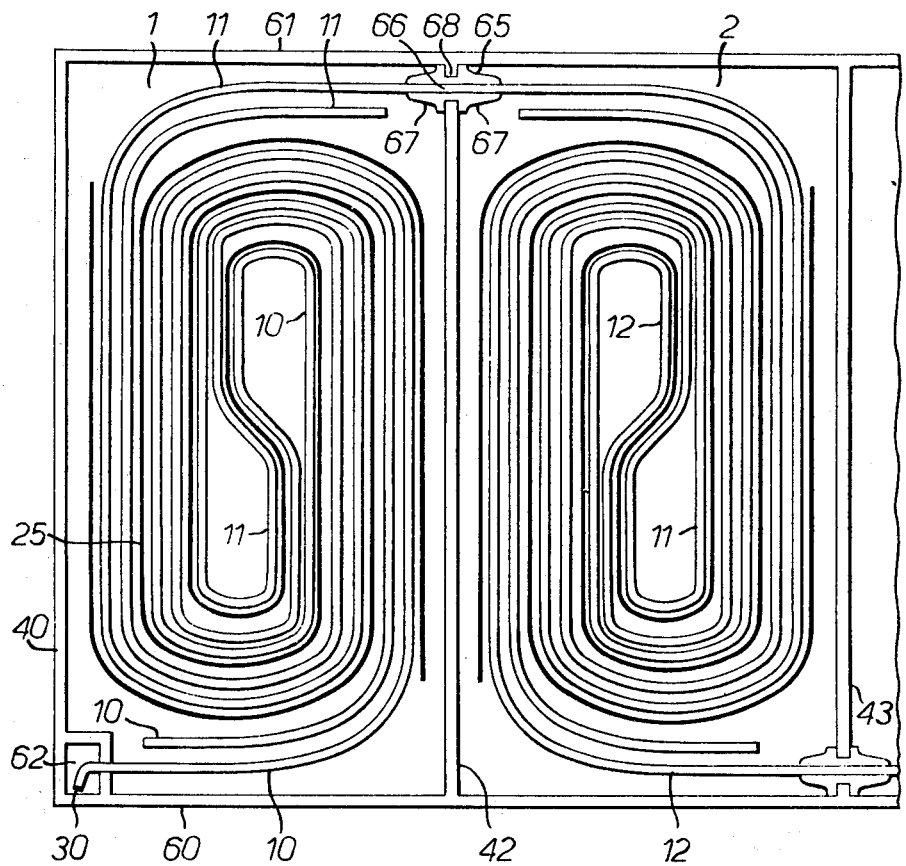
FIG. 2 is diagrammatic plan view of the end cell and its adjacent cell assembled into the battery container, the electrodes being wound from the centres and being shown in a loosely wound state to illustrate the mode of winding more clearly.

FIG. 2 shows one arrangement in which each cell portion e.g. 10 and 55 in FIG. 1 is wound from its mid point 57 so that a double layer of upper electrode is wound around a double layer of lower electrode with a single layer of separator material between the two double layers as shown in FIG. 2. This winding can be achieved by gripping the layer material from both faces with thin gripping members and then rotating the gripping members about an axis located parallel to them and between them. The spiral can then be compressed to flat form. FIG. 2 shows the spiral only partly flattened for ease of illustration.

Cells 1 and 2 only are shown in FIG. 2. The battery container, desirably made of thin walled polymer e.g. polypropylene 0.06 inches thick has an end wall 40 with an internal terminal compartment 62 into which the terminal end 30 of the piece 10 extends. A battery terminal can be formed by pouring a compatible lead alloy into this compartment so as to fill it and melt bond with the end 30.

The container has parallel side walls 60 and 61. The lower piece 11 has a polypropylene fillet 65 of generally H shaped form injection moulded around the region of its mid point 66 prior to insertion into the battery or desirably prior to pasting. The polymer extends right into the mesh of the grid and also desirably extends out in wings 67 on either side of the mid point so as to reinforce this intercell connector region. The fillet 65 is dimensioned so as to be a close but ready sliding fit into a slot 68 formed down the length of the partition 42.

Thus the electrode assemblies can be readily slid into position or held and the containers readily slid onto them desirably whilst the spirals are still held on the winding pins but after compression into flat packs.

Pressure and/or heat sealing or high frequency or ultrasonic electrodes may be used to seal the fillet 65 into the slot 68.

Alternatively or in addition adhesives may be used.

Figure 3:
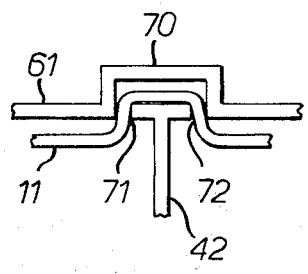
FIG. 3 is a plan view of an alternative form of intercell connector arrangement for use with the arrangement of FIG. 2.

In another alternative (see FIG. 3) the partition 42 is kept integral and electrode piece 11 is lead out through a slot 71 in the side wall 61 of the container into a small closed compartment 70 and back into the next cell 2 through another slot 72 in the side wall 61 of the container.

The compartment may be pre or post filled with a sealant composition e.g. a plastics composition e.g. an ethyl cellulose sealant composition or polypropylene.

Alternative ways of arranging the assembly shown in FIG. 1 into a compact cell array include folding each electrode array e.g. 10 and 55 in a zig zag fashion to form a stack in which two laminae of one polarity alternate with two laminae of the other polarity.

Figure 4:
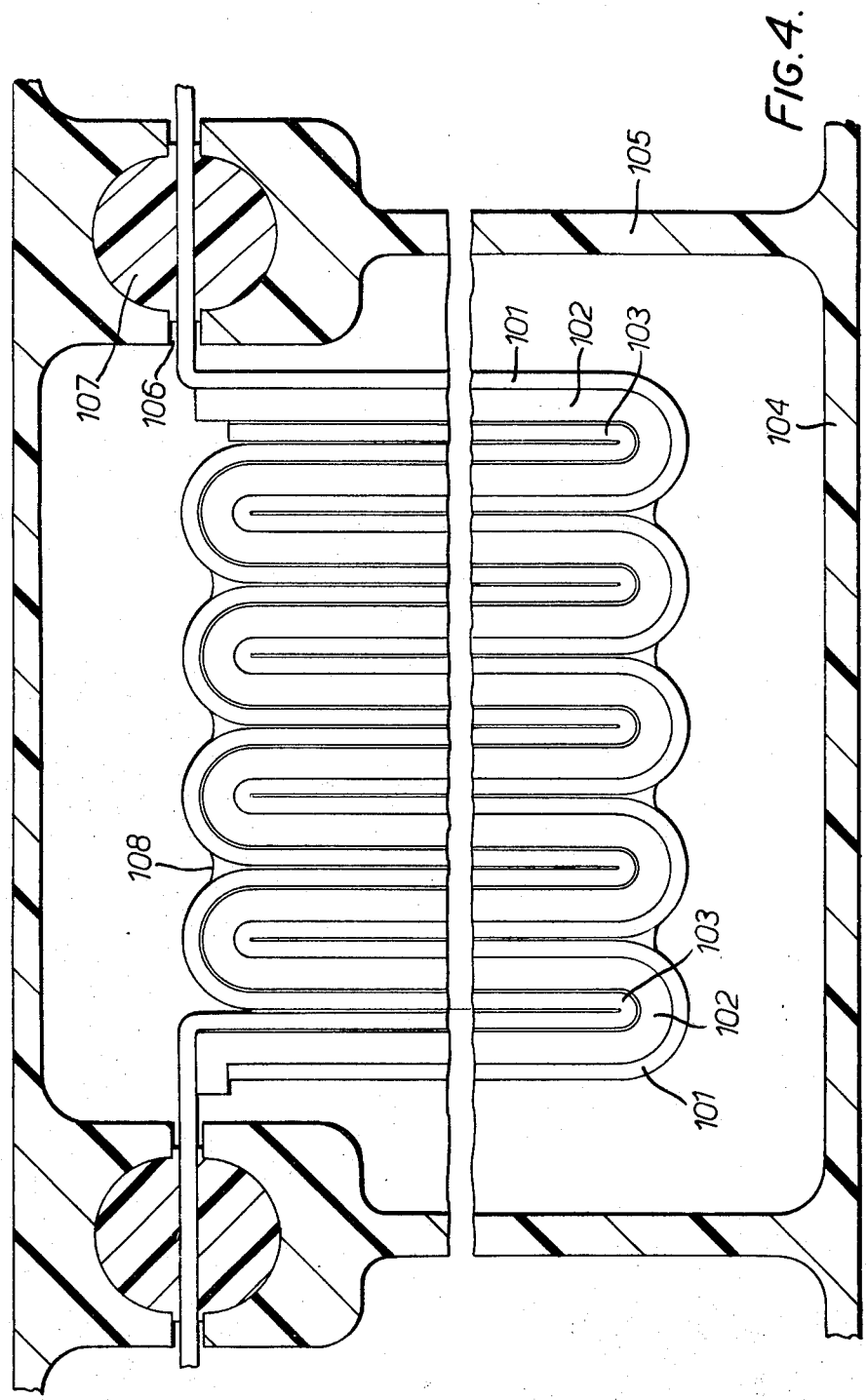
FIG. 4 is a sectional plan view of a single cell of a multicell battery with the electrode assembly folded as a zig zag array constructed in accordance with a second embodiment of the invention.

FIG. 4 shows a construction in which the negative electrode 101, the positive electrode 103 and the interposed layer 102 of separator material are folded in a zig-zag form so that adjacent layers are in contact with one another. The electrodes are positioned with the folds in the strips extending vertically, in a casing 104 formed of polypropylene which is provided with intercell partitions 105. Each partition has in it a vertical slot 106 extending substantially over its whole height. At this point the partition is of double walled form so as to provide a sealing cavity 107 through which the strip passes and into which a sealing material such as polypropylene can be poured or injected in a liquid or paste form to seal the strip where it passes through the partition.

The strips are provided with projections (not shown) at suitable points to serve as feet which rest on mud ribs in the conventional manner.

Each electrode comprises ten laminae, which are portions of the plate strip between successive folds. Each pair of adjacent laminae, which are of the same polarity, are burnt together along their edges, which are not integral, as is shown at 8, so as to improve current distribution.

Figure 5:
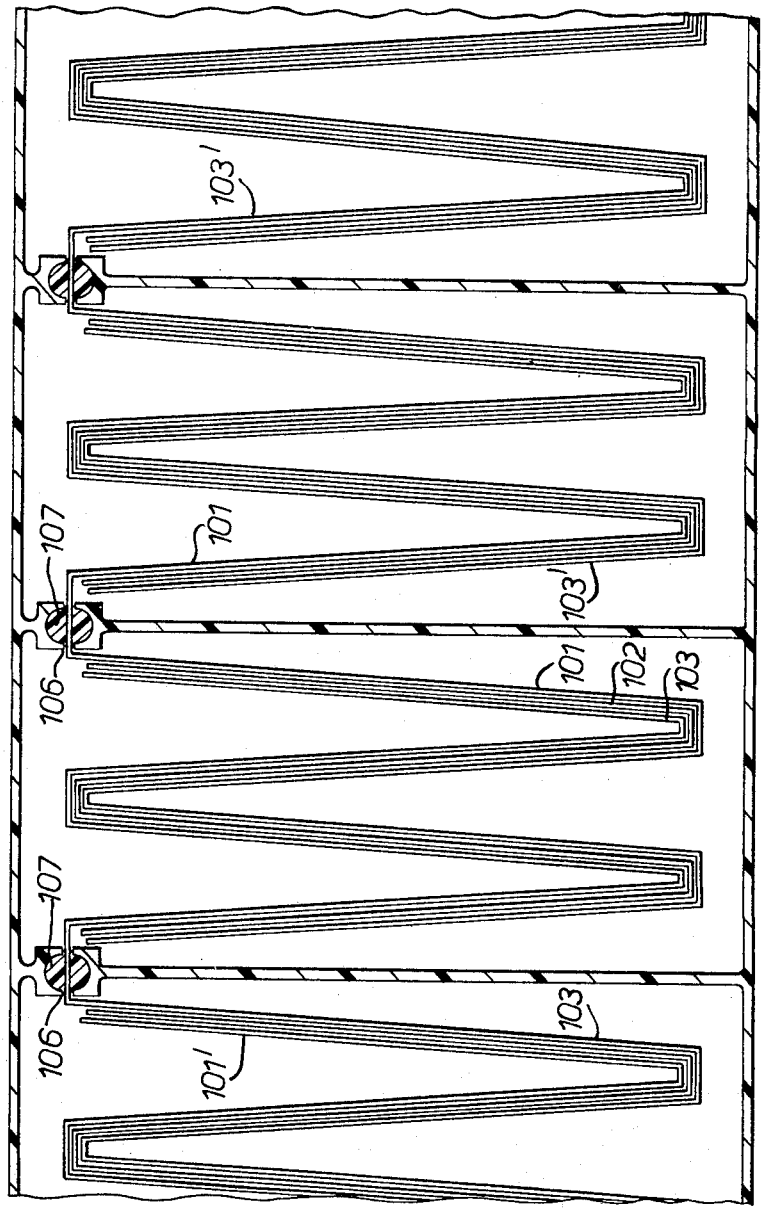
FIG. 5 is a sectional elevation of a number of cells of a different construction of a multicell battery.
Figure 6:
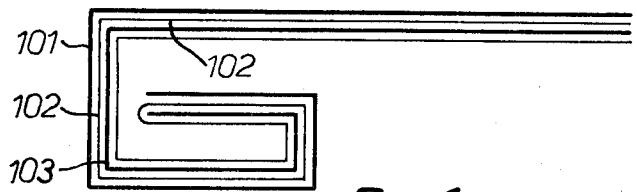
FIGS. 6 to 9 are views in the stages of construction of a set of electrodes of the flattened spiral type.

FIG. 5 is a view of a modified construction in which adjacent layers of the electrode are not in contact with each other and in which the folds in the strips extend horizontally. Each intercell partition 105 is provided with a slot which extends horizontally substantially over its whole width, conveniently between an upper part — integral with a lid — and a lower main part integral with the casing. As in the previous construction the partition is at this point of double-walled form so as to provide a sealing cavity 107.

As may be seen the cell 110 contains a negative electrode 101 and a positive electrode 103. The cell 111 to the right of it as seen in FIG. 5 has a positive electrode 101, which is part of the same strip as the negative electrode in the cell 110, but a negative electrode 103', which is part of a different strip. The cell 112 to the left of the cell 110 as seen in FIG. 5 has a positive electrode 101' which is part of a further strip and a negative electrode 103 which is part of the same strip as the positive electrode in the cell 110.

Figure 7:
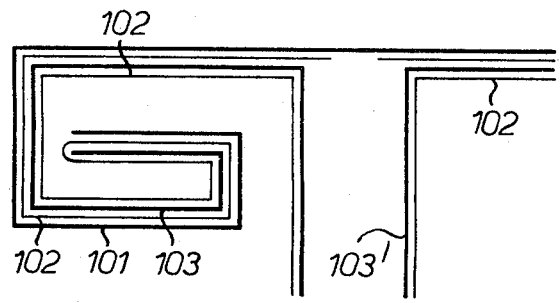
Figure 8:
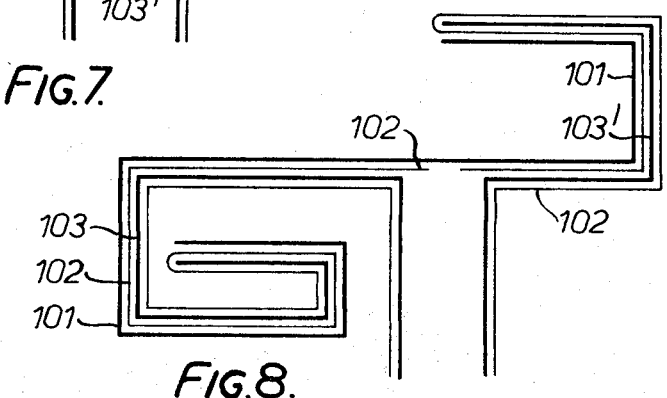

In a further embodiment, stages in the construction which are shown in FIGS. 6 to 9, the electrodes of each cell are in the form of a flattened spiral or "Swiss roll". Two strips 101 and 103 each associated with a layer of separator material 102 are superposed with their ends flush to form a sandwich. This is then rolled up for rather less than half its length into the configuration shown diagramatically in FIG. 6. The remaining half of one of the strips (strip 103 as shown in FIG. 7) is bent through 90° and may be used for connection to a battery terminal, whilst the remaining half of the other strip 101 is superposed over half of a further strip 103' also associated with a layer of separator material. The two superposed halves of the strips 101 and 103' are then partially wound up into the configuration shown in FIG. 8. The partially rolled electrode assembly is then rotated through 180° into the fully wound configuration shown in FIG. 9. The process is repeated as many times as is desired, the remaining half of the final strip is also used for connection to the other battery terminal.

The electrodes may be used in the battery casing in either a vertical or horizontal orientation.

Figure 9:
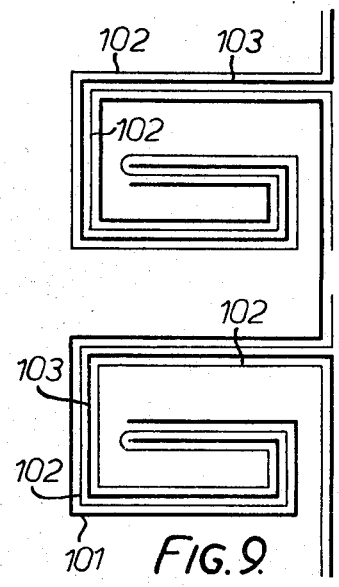
Figure 10:
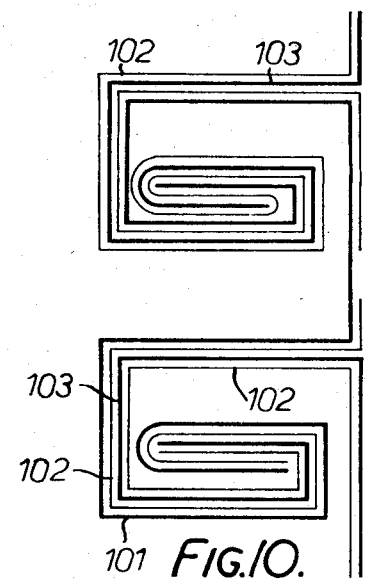
FIG. 10 is a modification of the construction shown in FIG. 9.

It will be appreciated that various modifications of the construction shown in FIG. 9 are possible. One example of such a modification is shown in FIG. 10 in which the strips have been rolled up from a position in which their ends were not flush but offset from one another by a distance equal to the length of one lamina. This results in the positive and negative electrode in alternate cells having one extra convolution as compared with FIG. 9 thereby avoiding two laminae of the same polarity facing one another as the case in the construction shown in FIG. 9.

It will be appreciated that, although the diagrams show the rolls as having only a small number of convolutions, the scope of the invenntion is not limited to this number and the rolls may have any number of convolutions.

Each roll may be initially wound to a flattened form or it may be initially wound to a cylindrical form and then pressed to the form of a flat stack.

Figure 11:
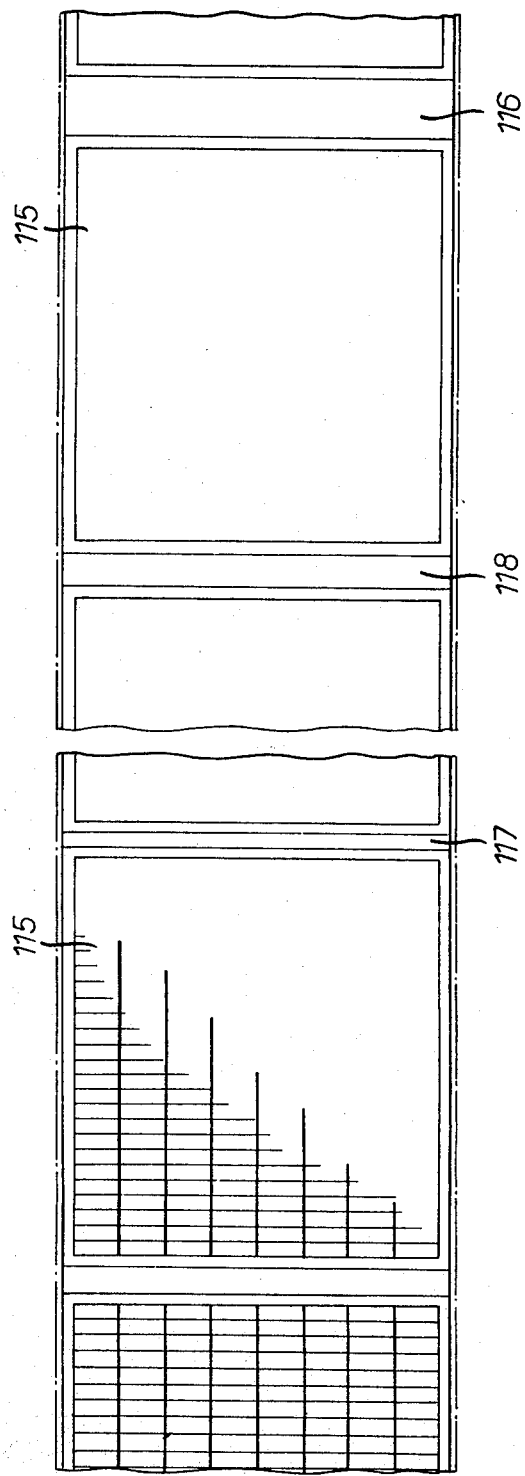
FIG. 11 is a plan view of one half of a standard plate strip.

FIG. 11 shows one half of a plate strip which is typically a five inches wide and four feet long, which is sufficient to afford 8 laminae 115, 4 positive laminae for one cell and four negative laminae for a neighbouring cell. The strip may be of any preferred form provided it will satisfactorily key and retain the active material. One conventional form of lattice comprises parallel bars of about half the overall thickness of the strip adjacent bars lying on opposite sides of the central plane of the strip. Such a lattice may be formed by casting, or by continuous casting and distorting as described in British patent specification No. 42759/72, (Case EPS.99) or by rolling. Again the lattice may take the form of expanded metal, or may comprise bars of Y shape for example formed by rolling and converging in the direction of rolling as described in British patent specification No. 1275414, (Case EPS.36).

Between the laminae are provided hinge areas which are of two different widths, a narrow hinge 117 being provided where the lamina will be at the inside of the fold and a wider hinge 118 where it will be at the outside of the fold. In addition at the centre of the strip there is a wider solid or perforated area 116 where the strip will pass through as intercell partition and connect the positive electrode of one cell to the negative electrode of an adjacent cell.

A separate paste may be used for the positive and negative portions of the strip, or, if preferred for simplicity, a standard paste may be employed, for both positive and negative.

In another alternative (not shown) the individual spiral assemblies e.g. such as that shown in FIG. 2 in cell 1 are wound separately. The piece 11 is made of such a length as to be capable of extending through into the next cell.

In order to make the 12 cell battery described with reference to FIGS. 1 and 2 twelve such spiral assemblies are formed and alternate assemblies are reversed or are wound separately in the reverse sense as shown in FIG. 2 and their ends 11 overlapped and welded to each other e.g. by resistance welding and/or pressure. Subsequent assembly is as described above.

This alternative has the advantage of simplifying the winding method required.

The separator material 25 is about 0.2 mms thick and has a tensile strength in the machine direction of 150 Kgs/cm$^2$ and 130 Kgs/cm$^2$ in the transverse direction. It has an average pore size of 1 micron and an elongation at break of 100% in the machine direction and 60% in the transverse direction.

It is made by biaxially stretching a chill roll cast film of high density polyethylene. It is sold by the Sekisui Chemical Co. as PCM separator film.

More broadly we prefer to use a separator material having a thickness in the range 0.1 to 0.3 mms, a tensile strength of 15 to 200 preferably 50 to 160 Kgs/cm$^2$, an elongation at break of 50 to 150%, a Gurley stiffness of 1 to 50 mg preferably 5 to 20 mg and a pore size of 0.1 to 10 microns preferably 0.5 to 5 microns.

What we claim as our invention and desire to secure by Letters Patent is:

1. A multi-cell lead acid electric storage battery in which each cell electrode structure comprises an assembly of a single first electrode incorporating a lead support of one polarity separated by a separator from a single second electrode incorporating a lead support of the other polarity an integral portion of said first electrode support extending out to one side of its cell and an integral portion of said second electrode support extending out to the other side of its cell, said first integral portion being connected to or integral with an electrode support structure in the adjacent cell, or a battery terminal, on its side of each cell, and the other integral portion being connected to an integral with an electrode support structure in the adjacent cell on its side of each cell, said integral portions extending substantially the full width or substantially the full height of the side of each cell, the cells being arranged to provide an array of multiple layers of electrodes of alternating polarity.

2. A battery as claimed in claim 1 in which the electrodes in each cell overlap for substantially half of their length.

3. A battery as claimed in claim 1 in which said integral portions extend the full width of the electrode.

4. A battery as claimed in claim 1 in which the electrodes are folded vertically, each passing through a vertical slot in the side of the cell, the slot being substantially the full height of the side.

5. A battery as claimed in claim 1 in which said integral portions pass through the side of the cell in a horizontal plane.

6. A battery as claimed in claim 1 in which the conductivity of the integral portion of the conductive support structure is enhanced by casting additional metal onto it or by attaching a metal fillet to it or by forming it with a greater cross sectional area of metal than the remainder of the conductive support.

7. A battery as claimed in claim 1 in which the integral portion of the conductive support structure has a fillet of thermoplastic weldable polymer material formed across its width so as to be sealable into a cooperating slot in the cell wall.

8. A battery as claimed in claim 1 in which each cell is formed by winding the assembly of electrodes and separator from their centre points so as to form a spirally wound pack having electrodes extending out from opposed sides in opposite directions.

9. A battery as claimed in claim 1 in which a universal active material composition convertible electrochemically to positive active material or to a negative active material is applied to all the electrode supports prior to assembly into the battery and the active material is converted to positive or negative form electrochemically in the battery.

10. A battery as claimed in claim 1 in which the integral portions of the conductive supports of adjacent cells each extend into the other cells and are overlapped and conductively secured to each other.

11. A battery as claimed in claim 11 in which each integral portion extends through the side of the cell and is sealed therein.

12. A battery as claimed in claim 11 in which said integral portion extends through the side of the cell.

13. A battery as claimed in claim 12 in which said integral portions pass through the side of the cell in a vertical plane.

14. A battery as claimed in claim 5 in which the electrodes are folded horizontally, each passing through a horizontal slot in the side of the cell.

15. A battery as claimed in claim 5 in which the electrodes are folded horizontally, each passing over the side of the cell.

16. A battery as claimed in claim 8 in which the electrode supports are made from thin expanded mesh lead alloy of 0.3 to 0.7 mm thickness and are wound so as to form a double layer.

17. A battery as claimed in claim 10 in which the overlapped integral portions are fused to each other.

* * * * *